Figure 1A:
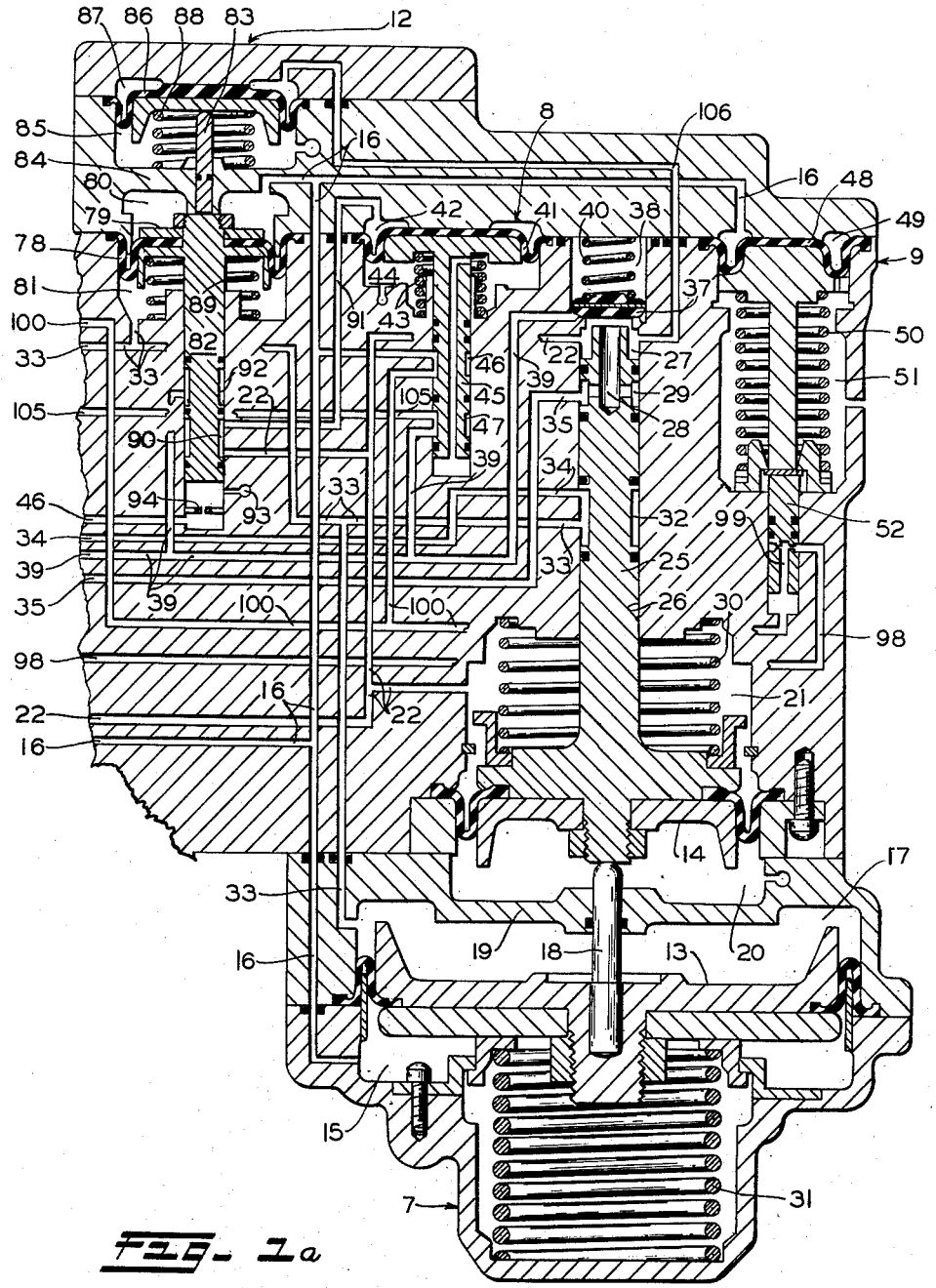

Feb. 2, 1960

G. T. McCLURE ET AL 2,923,577

FLUID PRESSURE BRAKE APPARATUS WITH IMPROVED CHARGING
CONTROL OF AUXILIARY AND CONTROL RESERVOIRS

Filed July 27, 1956

2 Sheets-Sheet 1

INVENTOR.
Glenn T. McClure
BY Thos. F. Hursen

ATTORNEY

United States Patent Office 2,923,577
Patented Feb. 2, 1960

2,923,577

FLUID PRESSURE BRAKE APPARATUS WITH IMPROVED CHARGING CONTROL OF AUXILIARY AND CONTROL RESERVOIRS

Glenn T. McClure, McKeesport, and Thomas F. Hursen, Monroeville, Pa., assignors to Westinghouse Air Brake Company, Wilmerding, Pa., a corporation of Pennsylvania Application July 27, 1956, Serial No. 600,612

7 Claims. (Cl. 303—60)

This invention relates to fluid pressure brake apparatus of the self-lapping type wherein the degree of application and release of brakes on a railway car or the like is controlled according to the degree of reduction and restoration, respectively, of pressure fluid in a brake pipe relative to the fluid pressure in a control reservoir; the invention relating more particularly to an apparatus of said type embodying an improved arrangement whereby the control reservoir and also an auxiliary or supply reservoir (both of which reservoirs are charged from the brake pipe) are isolated from the brake pipe and from each other promptly upon initiation of brake application.

With apparatus of the above type, if the control reservoir is not promptly cut off from the brake pipe and from the auxiliary reservoir when brake pipe pressure is reduced for initiating a brake application, control reservoir pressure can deplete by backflow into the brake pipe or flow to the auxiliary reservoir and hence result in a lower brake cylinder pressure than that which should be obtained for a given brake pipe pressure reduction; this possibility being especially serious in cases of successive brake applications, such as while descending a long grade, because control reservoir pressure could be successively reduced a few pounds per square inch (hereinafter abbreviated as p.s.i.) upon each successive reapplication of brakes. On the other hand, if auxiliary reservoir pressure is permitted to backflow into the brake pipe, it will not only undesirably reduce auxiliary reservoir pressure but also retard or reduce the application of brakes throughout the train by partially offsetting the operator-effected reduction of brake pipe pressure.

The principal object of this invention is therefore to provide an improved brake apparatus of the above type embodying means, preferably the same valve means which effects a quick service reduction in brake pressure, for promptly cutting off the control reservoir and auxiliary reservoir from the brake pipe and from each other as soon as brake pipe pressure is reduced a slight degree below its full charge value for initiating a brake application.

According to this object, a valve device responds to a slight initial reduction in brake pipe pressure below its normal full charge value to initially close an auxiliary reservoir slow charge communication and a control reservoir slow charge communication and a charging valve responds to brake cylinder pressure in a chamber in excess of a slight value to secondarily close both of said communications; such initial closure is preferably effected by the quick service valve during its movement from a normal position (in which it permits flow through said communications) to a quick service position( in which it effects a local quick service reduction in brake pipe pressure). These communications will be maintained closed until pressure in said chamber is reduced below said slight value, despite intervening operation of the quick service valve to normal position resultant from build-up in brake pipe pressure during a brake releasing operation.

Figure 1B:
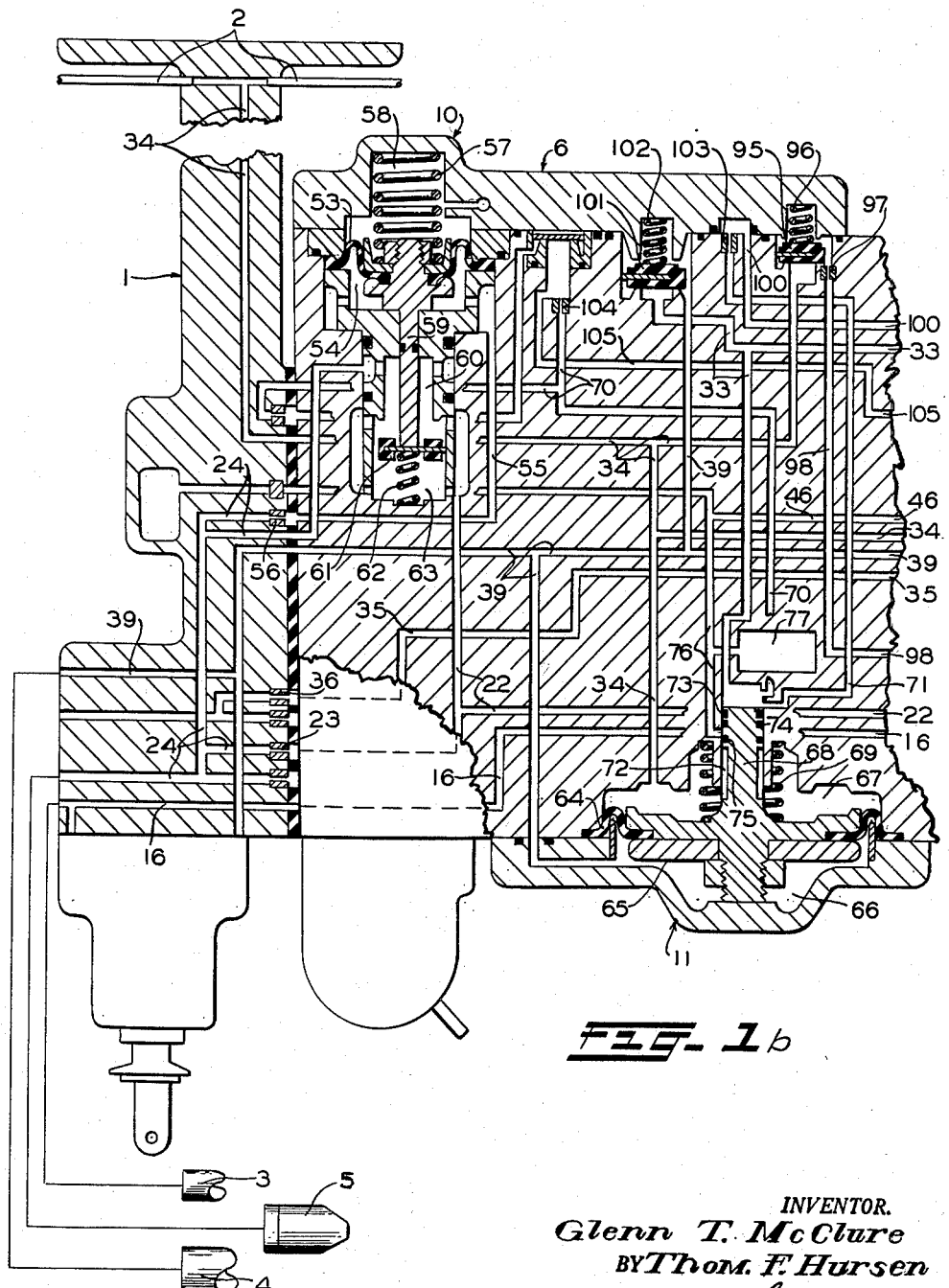

Other objects and advantages will become apparent from the following more detailed description of the invention and from the accompnaying drawings, wherein the Figs. 1a and 1b, when taken together, such that the left-hand edge of Fig. 1a is matched to the right-hand edge of Fig. 1b, constitute a diagrammatic view of a brake apparatus embodying the invention.

Description

On each brake-equipped car of the train there is provided a brake controlling valve device which, as shown in the drawings, comprises a pipe bracket 1, to which are connected the usual brake pipe 2, a control reservoir 3, an auxiliary reservoir 4, and a brake cylinder 5. On one face of the bracket 1 is mounted a sectionalized casing 6 containing a service valve device 7, a charging valve device 8, a charging cut-off valve device 9, and a brake cylinder inshot valve device 10, all of which may be substantially identical in structure and in operation with corresponding valve devices heretofore disclosed. Casing 6 also contains a quick service valve device 11 and a reduction insuring valve device 12, both of which differ from corresponding valve devices heretofore proposed according to features of the invention hereinafter to be described.

The service valve device 7 may comprise two coaxially arranged, spaced-apart movable abutments 13 and 14 of different effective areas and cooperably, though not positively, connected to each other so as to form a stack, as will be understood from subsequent description. The larger movable abutment 13 is subject at its under side, as viewed in Fig. 1a of the drawings, to pressure of fluid in a chamber 15 open via a passage 16 to the control reservoir 3; and said movable abutment has at the opposite side a chamber 17.

The movable abutment 13 is cooperably connected to the smaller movable abutment 14 through the medium of a coaxially arranged, cylindrical pusher stem 18 having sealing, slidably guided engagement with the wall of an aligned bore through a casing partition 19 separating chamber 17 from an atmospheric chamber 20; said stem at its respective ends engaging the movable abutments 13 and 14. At the side of movable abutment 14 opposite the chamber 20 is a chamber 21 that is constantly open to the brake cylinder 5 via a passage 22, a brake cylinder application choke 23, and a brake cylinder passage 24.

The movable abutment 14 is positively connected to a coaxially arranged, cylindrical service valve 25 having sealing, slidably guided engagement with the wall of an aligned bore 26 open to chamber 21. Adjacent its unconnected or free end, the valve 25 is of reduced diameter so as to define, in cooperation with the surrounding bore 26, an annular chamber 27 constantly open to a branch of passage 22; and extending inwardly from said free end is an axially arranged, bore-like opening 28 constantly open via suitable radial apertures to an elongated annular cavity 29 formed in said valve 25 intermediate its ends.

A helical spring 30 in chamber 21 acts on movable abutment 14 and, through the medium of stem 18 on movable abutment 13, for urging the stack to the position in which it is shown, and in which position movable abutment 13 operatively engages, but does not compress, the usual, suitably caged helical spring 31 in chamber 15, for thereby defining a brake release position of the service valve 25. In this position, an elongated annular cavity 32 in valve 25 connects a passage 33 leading to chamber 17 with a passage 34 open to the brake pipe 2. And also, with valve 25 in this position, cavity 29 registers with a brake cylinder release passage 35 open to atmosphere via a brake cylinder release choke 36, for thereby venting the brake cylinder 5 via passage 22, chamber 27, opening 28, cavity 29 and said release passage 35. Also, with valve 25 in brake release position, the free end of said valve is disengaged from a poppet-type brake cylinder supply valve 37 that controls fluid pressure communication between chamber 27 and a chamber 38 that is open via a passage 39 to the auxiliary reservoir 4; said valve 37 normally being held seated against an annular valve seat by the combined effects of auxiliary reservoir pressure and pressure of a helical bias spring 40 in chamber 38 for preventing such communication.

The charging valve device 8 may comprise a movable abutment 41 subject at one side to pressure of fluid in a chamber 42 and at the opposite side to pressure of a light helical bias spring 43 in an atmospheric chamber 44. The movable abutment 41 is operatively connected to a coaxially arranged, cylindrical charging valve 45 that projects through chamber 44 and adjacent its projecting end has sealing, slidably guided engagement with the wall of an aligned bore in the casing. The charging valve 45 has two spaced, elongated annular cavities 46 and 47 for effecting fluid pressure connections hereinafter to be described, when the charging valve 45 is in a charging position, to which it is biased by the pressure of spring 43 so long as pressure in chamber 42 is less than a chosen slight value, such as about 1 p.s.i.

The charging cut-off valve device 9 may comprise a movable abutment 48 that is subject at one side to pressure of fluid in a chamber 49 constantly open to a branch of control reservoir passage 16 and subject at the opposite side to pressure of a helical regulating spring 50 in an atmospheric chamber 51. The movable abutment 48 is operatively connected to a coaxially arranged, cylindrical charging cut-off valve 52 which has sealing, slidably guided engagement with the wall of an aligned bore open to chamber 51 and controls a fluid pressure communication hereinafter to be described.

The brake cylinder inshot valve device 10 may comprise a movable abutment 53 that is subject at one side to pressure of fluid in a chamber 54 constantly open via a passage 55 and a baffle choke 56 to a branch of brake cylinder passage 24; said movable abutment being subject at the opposite side to pressure of a helical regulating spring 57 in an atmospheric chamber 58. Positively connected to the movable abutment 53 is a coaxially arranged cylindrical pusher stem 59 having sealing, slidably guided contact with the wall of an aligned bore through a casing partition separating chamber 54 from a chamber 60 that is in direct communication with a branch of brake cylinder passage 24. This pusher stem 59 projects into chamber 60 and is adapted at its projecting end to abuttingly engage and unseat a preferably disc-shaped inshot valve 61 against resistance of a helical bias spring 62 that is contained in a chamber 63 open to a branch of passage 22.

The quick service valve device 11 may, for sake of illustration, comprise an annular flexible diaphragm 64 suitably clamped about its outer edge between sections of the casing 6 and about its inner edge between portions of a follower assemblage 65. Diaphragm 64 is subject at one side to pressure of fluid in a chamber 66 constantly open to a branch of auxiliary reservoir passage 39, and is subject at the opposite side to pressure of fluid in a chamber 67 constantly open to a branch of brake pipe passage 34. Preferably formed integrally with one of the parts of the follower assemblage 65 is a coaxially arranged, cylindrical quick service valve 68 having sealing, slidably guided engagement with the wall of an aligned bore open at one end to chamber 67.

When brake pipe pressure in chamber 67 is substantially equal to auxiliary reservoir pressure in chamber 66, a helical bias spring 69 in the former chamber is effective to urge the valve 68 to a normal position, in which it is shown in the drawing, and which position is defined by abutting contact of the follower assemblage 65 with the end wall of chamber 66.

According to a feature of the invention, with the quick service valve 68 in normal position, a branch of passage 33 is uncovered past the end of said valve to a passage 70 and also to a passage 71 for reasons subsequently to be explained; and an elongated annular cavity 72 in said valve is exposed solely to chamber 67. Intermediate the end of valve 68 and the cavity 72 are three spaced O-rings 73, 74 and 75 carried by said valve and having sealing contact with the wall of the valve bore. With valve 68 in normal position, O-rings 73 and 74 isolate the passages 33, 70 and 71 from a passage 76 leading to a quick service volume 77; and O-ring 75 isolates said passage 76 from the cavity 72.

The reduction insuring valve device 12 may, for sake of illustration, comprise an annular flexible diaphragm 78 suitably clamped about its outer edge between sections of the casing and about its inner edge between parts of a diaphragm follower assemblage 79. The diaphragm 78 is subject at one side to pressure of fluid in a chamber 80 constantly open to a branch of control reservoir passage 16, and subject at the opposite side to pressure of fluid in a chamber 81 constantly open to a branch of passage 33. Preferably formed integrally with one of the parts of the follower assemblage 79 is a coaxially arranged, cylindrical reduction insuring valve 82 having sealing, slidably guided engagement with the wall of an aligned bore open at one end to chamber 81.

Arranged coaxially with follower assemblage 79 in a cylindrical pusher stem 83 having sealing, slidably guided engagement with the wall of an aligned bore through a casing partition 84 separating chamber 80 from an atmospheric chamber 85 at one side of a movable abutment 86. When pressure of fluid in a chamber 87 at the opposite side of movable abutment 86 is less than a chosen small value, such as about 1 p.s.i., a helical bias spring 88 in chamber 85 will urge the movable abutment 86 to the position in which it is shown and in which it exerts no thrust on pusher stem 83 and hence on follower assemblage 79.

A helical regulating spring 89 in chamber 81 acts on follower assemblage 79 for urging the valve 82 to a normal position, in which it is shown on the drawing, and which position is defined by contact of said follower assemblage with partition 84.

According to a feature of the invention, with reduction insuring valve 82 in normal position, an elongated annular cavity 90 formed in said valve connects a branch of passage 22 with a passage 91 leading to chamber 42 of charging valve device 8; an elongated annular cavity 92 formed in said valve intermediate chamber 81 and cavity 90 is exposed solely to a branch of auxiliary reservoir passage 39; and the projecting end of said valve 82 uncovers an atmospheric vent port 93 for connecting quick service volume 77 to atmosphere via a branch of passage 76, a continued quick service reduction choke 94 and said port.

*Operation*

Assume initially that the apparatus is devoid of fluid under pressure. Under this condition, the various components will be biased to the respective positions in which they are shown in the drawings.

To initially charge the apparatus, fluid under pressure is supplied to the brake pipe 2 at the locomotive in the well-known manner. On a particular car, some of this fluid will flow via a branch of passage 34 and through cavity 32 of service valve 25 in brake release position to passage 33 and chamber 17 for normally (except under a retarded recharge condition not pertinent to the present invention) assuring that the service valve will be maintained in said position.

Meanwhile, some of the fluid supplied to brake pipe passage 34 will flow via a branch thereof to the under side of a control reservoir charging check valve 95 and unseat the latter against the light bias of a helical spring 96 and then flow past said check valve and through a control reservoir fast charge choke 97 to a passage 98 and thence via a suitable opening 99 in the charging cut-off valve 52 of device 9 to a passage 100, whence it will flow via cavity 46 of charging valve 45 in charging position to a branch of control reservoir passage 16 for charging the control reservoir 3 at a relatively fast rate, as determined by said choke 97, until control reservoir pressure, as noted in chamber 49 of device 9, has increased to a preselected value, such as about 65 p.s.i., as determined by the value of spring 50; whereupon such pressure in chamber 49 will shift the movable abutment 48 and thereby the charging cut-off valve 52 from a normal position, in which it is shown, to a cut-off position in which it disconnects passage 98 from passage 100 for closing the control reservoir fast charge communication just described.

Meanwhile, some fluid will also flow via a branch of passage 33 to the underside of an auxiliary reservoir charging check valve 101 and unseat the latter against the bias of a helical spring 102 and then flow past said check valve to a branch of auxiliary reservoir passage 39 for charging the auxiliary reservoir 4 at a relatively fast rate, via the auxiliary reservoir fast charge communication just described, until auxiliary reservoir pressure has increased to a value within about 1.7 p.s.i. below brake pipe pressure, as determined by the selected value of spring 102; whereupon check valve 101 will be seated for closing said fast charge communication.

Meanwhile, according to features of the invention, some fluid will also flow to the control reservoir 3 via a branch of passage 33, passage 71 (then uncovered to passage 33 past the end of quick service valve 68 in normal position), a control reservoir combined slow charge and overcharge dissipation choke 103, a branch of passage 100, cavity 46 of charging valve 45 in charging position, and control reservoir passage 16, constituting a control reservoir slow charge communication via which pressures in the brake pipe 2 and control reservoir 3 may equalize after closure of the above-described control reservoir fast charge communication. Also, some fluid will flow to the auxiliary reservoir 4 via the last-mentioned branch of passage 33, passage 70 (then uncovered to passage 33 past the end of quick service valve 68 in normal position), an auxiliary reservoir slow charge choke 104, a passage 105, cavity 47 of charging valve 45 in charging position, and a branch of auxiliary reservoir passage 39, constituting an auxiliary reservoir slow charge communication, for permitting auxiliary reservoir pressure to equalize with brake pipe pressure following closure of the auxiliary reservoir fast charge communication above described.

Throughout initial charging, the quick service valve 68 will be maintained in normal position, in which it is shown, because auxiliary reservoir pressure as noted in chamber 66 will never exceed brake pipe pressure as noted in chamber 67, due to the bias of the auxiliary reservoir charging check valve spring 102 and the restricted flow capacity through slow charge choke 104. Also, in view of the restricted flow capacity through chokes 97 and 103, control reservoir pressure as noted in chamber 80 of reduction insuring valve device 12 will not increase as rapidly as brake pipe pressure in chamber 81 and hence the reduction insuring valve 82 will be maintained in normal position, in which it is shown.

Upon completion of initial charging, the various components will be in the respective positions in which they are shown in the drawings, with the exception of the charging cut-off valve 52, which will be in its previously defined cut-off position.

To effect an application of brakes, pressure of fluid in the brake pipe 2 is reduced at the locomotive in the well-known manner. When, on a particular car, brake pipe pressure as noted in chamber 67 of quick service valve device 11 has been reduced a chosen slight degree, such as .7 p.s.i., the diaphragm 64 will be deflected by auxiliary reservoir pressure in chamber 66 for shifting quick service valve 68 against resistance of spring 69 to a quick service position.

According to the invention, during movement of quick service valve 68 to quick service position, the O-ring 73 will be carried past the passage 71 and then the passage 70 for successively closing the control reservoir slow charge communication and then the auxiliary reservoir slow charge communication, by isolating passages 70 and 71 from the passage 33 leading to the brake pipe 2. With quick service valve 68 in quick service position, the passage 70 will be isolated from the passage 33 and from passage 71 by O-rings 73 and 74; passage 71 will be isolated from passage 76 by O-ring 75; and valve cavity 72 will be in registry with passage 76 for causing a local quick service reduction in brake pipe pressure by flow of brake pipe air via chamber 67, cavity 72 and passage 76 to the quick service volume 77, which is then vented via a branch of passage 76, choke 94, and atmospheric vent port 93, with reduction insuring valve 82 in its normal position in which it is shown; it being noted that following initial fast equalization of brake pipe pressure into the quick service volume, brake pipe pressure will continue to reduce at the restricted rate controlled by choke 94 so long as the reduction insuring valve remains in normal position.

Thus, the quick service valve 68 in moving to quick service position, will isolate the control reservoir 3 and auxiliary reservoir 4 from the brake pipe and from each other, for thereby closing the control reservoir slow charge communication and auxiliary reservoir slow charge communication even though the charging valve 45 is then in charging position.

When brake pipe pressure, as noted in chamber 17 of service valve device 7, has reduced a preselected degree, such as about 3 p.s.i., below control reservoir pressure as noted in chamber 15, the latter pressure will be effective to shift the service stack upwardly against the combined resistance of pressure in chamber 17 and pressure of spring 30, for thereby shifting service valve 25 to a brake application position, in which the projecting end of said valve abuttingly and sealingly engages valve 37 and holds same unseated against resistance of spring 40. With service valve 25 in this position, fluid under pressure will flow from auxiliary reservoir 4 to the brake cylinder 5 via a branch of auxiliary reservoir passage 39, chamber 38, thence past the unseated valve 37, and through chamber 27, to passage 22. So long as brake cylinder pressure as noted in chamber 54 is less than a chosen value, such as 10 p.s.i., as determined by the value of spring 57, said spring acting through movable abutment 53 and pusher stem 59 will hold the inshot valve 61 unseated, for permitting flow via a branch of passage 22 and past unseated valve 61 to chamber 60 and thence directly to brake cylinder passage 24 in by-pass of brake cylinder application choke 23 to rapidly take up slack in the brake rigging. The valve 61 will be closed by spring 62 when brake cylinder pressure in chamber 54 exceeds said chosen value and causes the movable abutment 53 to shift against resistance of spring 57 and thereby retract the stem 59; whereupon flow to the brake cylinder 5 will be solely via and at the rate controlled by choke 23.

Some of the fluid thus supplied to the brake cylinder 5 will flow via a branch of passage 22 and the usual baffle choke (not shown) to chamber 21 of service valve device 7. The effective area of movable abutment 13 is preferably about 2.9 times the effective area of movable abutment 14, so that for each p.s.i. that brake pipe pressure is reduced (in excess of the aforementioned preselected 3 p.s.i. bias) below control reservoir pressure, a brake cylinder pressure of 2.9 p.s.i. will be obtained. Hence, when the brake cylinder pressure as noted in chamber 21 has increased, according to this proportion, to a degree corresponding to the operator-effected reduction in brake pipe pressure, the service stack will be shifted downwardly and thereby carry the service valve 25 to a lap position, intermediate its brake application and brake release positions. With valve 25 in lap position, the projecting end of said valve sealingly engages the valve 37, but the latter valve is held seated by auxiliary reservoir pressure in chamber 38 and pressure of spring 40, for thereby causing fluid to be bottled up in the brake cylinder 5 at a pressure corresponding to the operator-effected reduction in brake pipe pressure.

Meanwhile, some of the fluid under pressure supplied to the brake cylinder 5 by the service valve 25 in brake application position, will flow via a branch of passage 22, cavity 90 of reduction insuring valve 82 in normal position, and passage 91 to chamber 42 of charging valve device 8. When fluid pressure in chamber 42 exceeds the illustrative 1 p.s.i., as determined by the bias effect of spring 43, the charging valve 45 will be shifted against resistance of said spring to a cut-off position, in which passage 100 is disconnected from control reservoir passage 16 and passage 105 is disconnected from auxiliary reservoir passage 39, for thereby secondarily closing the control reservoir and auxiliary reservoir slow charge communications, which communications were initially closed by operation of the quick service valve 68 to quick service position, as above described.

Meanwhile, some of the fluid supplied to the brake cylinder 5 will flow to another branch of passage 22, through chamber 27, and a passage 106 to chamber 87 of reduction insuring valve device 12. When the combined effect of brake cylinder pressure in chamber 87 and control reservoir pressure in chamber 80 acting on movable abutment 86 and diaphragm 78, respectively, exceeds the opposing effect of the springs 88 and 89 and reduced brake pipe pressure in chamber 81, such as will occur when brake pipe pressure has been reduced a predetermined degree, such as about 4 p.s.i., the reduction insuring valve 82 will be shifted downwardly from normal position, in which it is shown, to a cut-off position. With valve 82 in this position, vent port 93 is lapped for cutting off the quick service volume 77 from atmosphere; passage 22 is disconnected from passage 91; and valve cavity 92 connects a branch of auxiliary reservoir passage 39 with passage 91 for admitting auxiliary reservoir air to the charging valve chamber 42 to maintain the charging valve 45 in its cut-off position. The reduction insuring valve device 12 thus operates to assure that whenever brake pipe pressure is initially reduced the illustrative slight .7 p.s.i. below its normal full charge value, brake pipe pressure will be reduced the illustrative 4 p.s.i. for thereby assuring a minimum application of brakes, through the train, of a substantially uniform degree irrespective of the "dead" brake pipe volume on adjacent non-brake-equipped cars.

To effect a release of brakes, brake pipe pressure is increased at the locomotive in the well-known manner. This increase in brake pipe pressure, as noted in chamber 17 of service valve device 7 on a particular car, is effective in cooperation with brake cylinder pressure in chamber 21 to shift the service stack downwardly against the opposing control reservoir pressure in chamber 15 and thereby carry the service valve 25 to its brake release position, in which it is shown. With service valve 25 in this position, fluid under pressure will be released from the brake cylinder 5 via passage 22, chamber 27, opening 28 in valve 25, cavity 29, passage 35, and brake cylinder release choke 36 at the rate controlled by said choke.

If brake pipe pressure is only partially restored towards its normal charge value, in order to effect a graduated release of brakes, then the service valve 25 will be shifted to lap position when brake cylinder pressure has been reduced to a value corresponding to the operator-effected increase in brake pipe pressure; and since pressure in chamber 42 will, under this condition, exceed the illustrative 1 p.s.i., as determined by the bias effect of spring 43, the charging valve 45 will be maintained in its cut-off position, for thereby maintaining the previously defined auxiliary reservoir slow charge communication and the control reservoir slow charge communication closed, even if brake pipe pressure should be increased to a value above auxiliary reservoir pressure and thereby cause return of the quick service valve 68 to its normal position in which passages 70 and 71 are reexposed to the brake pipe via passage 33.

If, however, brake pipe pressure is fully restored in order to cause a full release of brakes, the service valve 25 will remain in brake release position, thereby completely venting the brake cylinder 5.

When brake pipe pressure in chamber 81 of reduction insuring valve device 12 has been restored to within a chosen degree, such as 3 p.s.i., below its normal full charge value, brake cylinder pressure in chamber 87 will have been reduced sufficiently to permit diaphragm 78 to deflect upwardly for thereby carrying valve 82 to an intermediate position, intermediate its cut-off and normal positions. In this intermediate position, the vent port 93 is uncovered past the projecting end of valve 82 to quick service volume 77 for venting said volume to atmosphere, so that if brake pipe pressure should be reduced slightly below the then existing value, a local quick service reduction in brake pipe pressure will be obtained; and also valve cavity 92 will continue to connect auxiliary reservoir passage 39 to passage 91 for maintaining the supply of auxiliary reservoir air to the charging valve chamber 42 and thereby maintaining the charging valve 45 in its cut-off position.

With quick service volume pressure no longer effective on the projecting end of valve 82, because such projecting end is now exposed to atmospheric pressure, the valve 82 will be caused to hesitate in its upward movement and remain in intermediate position until brake pipe pressure has been restored to within about 2 p.s.i. of its normal full charge value; whereupon said valve will resume its upward movement and be carried to its normal position. During such movement to normal position, passage 91 will be successively disconnected from auxiliary reservoir passage 39 and then connected via valve cavity 90 to passage 22; whereupon the charging valve chamber 42 will be promptly vented to atmosphere via passage 22 and the then completely vented brake cylinder 5, with the result that the charging valve 45 will be shifted to charging position for thereby reopening the auxiliary reservoir slow charge communication and control reservoir slow charge communication.

*Summary*

It will now be seen that the improved brake apparatus embodies a novel arrangement whereby a quick service valve device 11 and charging valve device 8 cooperate to serially control flow through both an auxiliary reservoir slow charge communication and a control reservoir slow charge communication; that the quick service valve device responds to a slight, such as .7 p.s.i., reduction in brake pipe pressure to initially close both of these communications and isolate the control reservoir 3 from the auxiliary reservoir 4 as well as effect a local quick service reduction in brake pipe pressure; that the charging valve device thereafter responds to brake cylinder pressure in excess of a slight value to secondarily close both of said communications; and that said communications will be maintained closed, despite intervening operation of the quick service valve device to its normal position, until pressure in the charging valve control chamber is reduced below said slight value, which reduction will not occur until after the reduction insuring valve has returned to its normal position by restoration of brake pipe pressure to a value within about 2 p.s.i. of its normal full charge value.

Having now described the invention, what we claim as new and desire to secure by Letters Patent, is:

1. A fluid pressure brake apparatus, comprising in combination a normally charged brake pipe, an auxiliary reservoir, a control reservoir, a first normally open charging communication connecting the auxiliary reservoir with the brake pipe, a second normally open charging communication connecting the control reservoir with the brake pipe, quick service valve means responsive to a slight reduction in brake pipe pressure below auxiliary reservoir pressure to close the said charging communications for thereby isolating the auxiliary reservoir and control reservoir from each other and from the brake pipe and also effect a local withdrawal of fluid under pressure from the brake pipe for causing a quick service reduction in brake pipe pressure, and other valve means responsive to a reduction in brake pipe pressure, greater than said slight reduction, below control reservoir pressure to supply fluid under pressure from said auxiliary reservoir for effecting an application of brakes, whereby both the auxiliary reservoir and control reservoir will be cut off from each other and from the brake pipe prior to the recited operation of said other valve means.

2. A fluid pressure brake apparatus, comprising, in combination, a normally charged brake pipe, an auxiliary reservoir, a control reservoir, a first normally open resticted charging communication connecting the auxiliary reservoir with the brake pipe, a second normally open restricted charging communication connecting the control reservoir with the brake pipe, a quick service communication via which fluid under pressure may be released from said brake pipe for causing a quick service reduction in brake pipe pressure, quick service valve means responsive to an initial slight reduction in brake pipe pressure below normal charge value to close both of said charging communications for isolating the auxiliary reservoir and control reservoir from each other and from the brake pipe and also connect the brake pipe to said quick service communication, service valve means responsive to a chosen reduction in brake pipe pressure, greater than said slight reduction, relative to control reservoir pressure to supply fluid under pressure from said auxiliary reservoir for effecting an application of brakes, and reduction insuring valve means normally opening said quick service communication to atmosphere and responsive to a reduction in brake pipe pressure, greater than said chosen reduction, below full charge value to close off said quick service communication from atmosphere for terminating the quick service reduction in brake pipe pressure.

3. A fluid pressure brake apparatus, comprising in combination a normally charged brake pipe, an auxiliary reservoir, a control reservoir, a first normally open charging communication connecting the auxiliary reservoir with the brake pipe, a second normally open charging communication connecting the control reservoir with the brake pipe, first valve means responsive to a slight reduction in brake pipe pressure below auxiliary reservoir pressure to close both of the charging communications for thereby isolating the auxiliary reservoir and control reservoir from each other and from the brake pipe, a brake cylinder, other valve means normally venting the brake cylinder and responsive to a reduction in brake pipe pressure greater than said slight reduction below control reservoir pressure for supplying fluid under pressure from said auxiliary reservoir to said brake cylinder, and third valve means operable by brake cylinder pressure in excess of a small value to additionally close both of said charging communications.

4. A fluid pressure brake apparatus, comprising in combination a normally charged brake pipe, an auxiliary reservoir, a control reservoir, a first normally open restricted charging communication connecting the auxiliary reservoir with the brake pipe, a second normally open restricted charging communication connecting the control reservoir with the brake pipe, a normally vented brake controlling communication to which fluid under pressure is supplied for applying brakes and from which fluid under pressure is released for releasing brakes, self-lapping type service valve means controlled by control reservoir pressure opposing brake pipe pressure and brake controlling communication pressure and responsive to a reduction in brake pipe pressure in excess of a chosen degree below control reservoir pressure to supply fluid under pressure from said auxiliary reservoir to said bake controlling communication, and two fluid pressure actuated charging control means serially controlling flow through both of said charging communications and each normally positioned for permitting such flow, one of said charging control means being responsive to a slight reduction in brake pipe pressure of less than said chosen degree below normal charge value to initially close both of said charging communications and also effect a local withdrawal of fluid under pressure from said brake pipe, and the other of said charging control means being thereafter operable by pressure of fluid in said brake controlling communication to additionally close both of said charging communications, whereby both of said charging communications will be maintained closed for isolating the auxiliary reservoir and control reservoir from each other and from the brake pipe until said brake controlling communication is substantially vented.

5. A fluid pressure brake apparatus, comprising in combination a normally charged brake pipe, an auxiliary reservoir, a control reservoir, a first normally open charging communication connecting the auxiliary reservoir with the brake pipe, a second normally open charging communication connecting the control reservoir with the brake pipe, a brake cylinder, a quick service volume, quick service means responsive to an initial slight reduction in brake pipe pressure below normal charge value to close both of said charging communications for isolating the auxiliary reservoir and control reservoir from each other and from the brake pipe and also connect the brake pipe to said quick service volume for effecting a local quick service reduction in brake pipe pressure, service valve means controlled by control reservoir pressure opposing brake pipe pressure and brake cylinder pressure and normally venting the brake cylinder and responsive to a chosen reduction in brake pipe pressure, greater than said slight reduction, below control reservoir pressure to effect supply of fluid under pressure from the auxiliary reservoir to the brake cylinder, charging valve means responsive to pressure of fluid in a chamber to close both of said charging communications, and reduction insuring valve means normally connecting said quick service volume to atmosphere and said brake cylinder to said chamber and responsive to a reduction in brake pipe pressure, greater than said chosen reduction, relative to control reservoir pressure to close off said quick service volume from atmosphere and also cut off the brake cylinder from said chamber and connect said chamber to said auxiliary reservoir.

6. A fluid pressure brake apparatus comprising, in combination, a normally charged brake pipe, an auxiliary reservoir, a control reservoir, a brake cylinder, a quick service volume other than the brake cylinder, two valve devices each serially controlling restricted flow of fluid under pressure between the brake pipe and auxiliary reservoir and control reservoir and normally positioned for permitting such flow, one of said valve devices being responsive to a slight reduction in brake pipe pressure below auxiliary reservoir to successively cut off the brake pipe from both of said reservoirs and then open the brake pipe to the quick service volume for effecting a local quick service reduction in brake pipe pressure, and the other of said valve devices being responsive to pressurization of a chamber in excess of a small value to additionally close off the brake pipe from both of said reservoirs, service valve means controlled by control reservoir pressure opposing brake pipe pressure and brake cylinder pressure and responsive to a reduction in brake pipe pressure, greater than said slight reduction, below control reservoir pressure to supply fluid under pressure from the auxiliary reservoir to the brake cylinder, and reduction insuring valve means normally connecting the quick service volume to atmosphere and connecting said chamber to the brake cylinder and responsive to a predetermined further reduction in brake pipe pressure below control reservoir pressure to close off said quick service volume from atmosphere and disconnect said chamber from the brake cylinder and connect said chamber to the auxiliary reservoir.

7. A fluid pressure brake apparatus comprising a normally charged brake pipe, an auxiliary reservoir, a control reservoir, a first restricted charging communication normally open for permitting fluid flow in both directions between the brake pipe and auxiliary reservoir, a second restricted charging communication normally open for permitting fluid flow in both directions between the brake pipe and control reservoir so that the latter may be charged to equality with brake pipe pressure, valve means responsive to a slight reduction in brake pipe pressure below auxiliary reservoir pressure to close both of said charging communications, a normally vented brake cylinder, and a service valve device controlled by control reservoir pressure acting in opposition to the combined pressures of fluid in respective chambers open to the brake pipe and to the brake cylinder, said service valve device being responsive to a reduction in brake pipe pressure, greater than said slight reduction, below control reservoir pressure to supply fluid under pressure from said auxiliary reservoir to said brake cylinder for providing in said brake cylinder fluid at a pressure corresponding to the extent brake pipe pressure is reduced below control reservoir pressure, whereby said valve means will operate to cut off both the auxiliary reservoir and the control reservoir from the brake pipe prior to the recited operation of said service valve device.

References Cited in the file of this patent

UNITED STATES PATENTS

| | | |
|---|---|---|
| 1,671,089 | Farmer et al. | May 22, 1928 |
| 2,672,376 | Cook | Mar. 16, 1954 |
| 2,707,134 | Cook | Apr. 26, 1955 |